Figure 1:
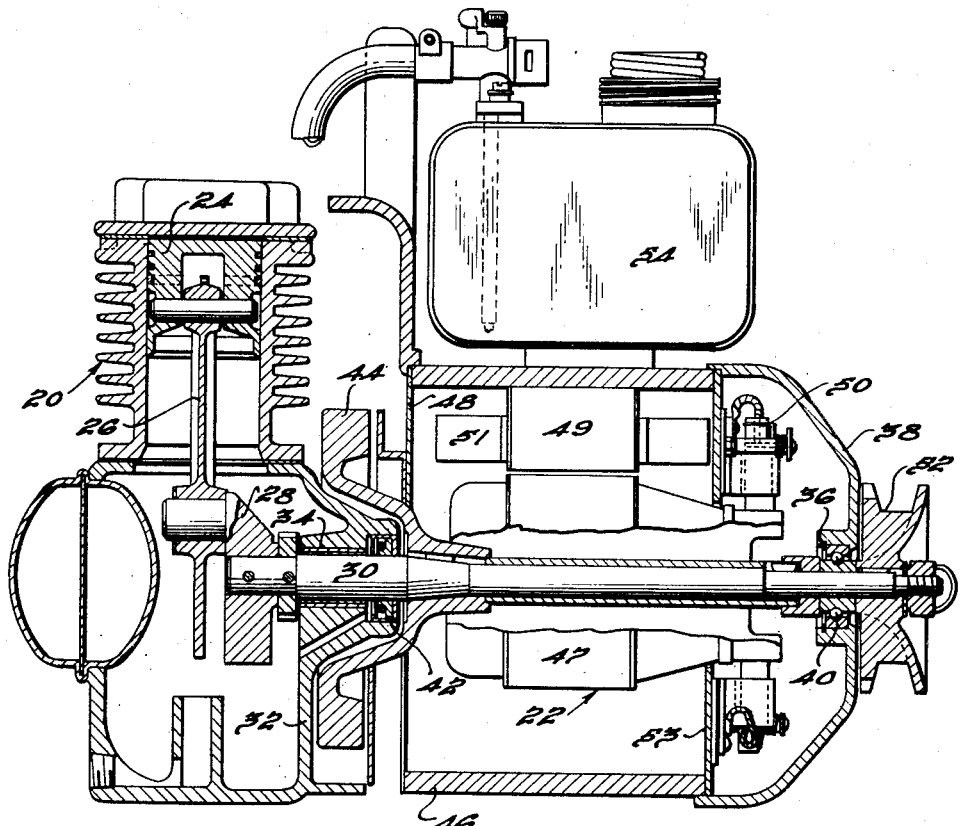

Jan. 17, 1939.  H. E. WILBER  2,144,445

MOTOR CONTROL SYSTEM

Original Filed Sept. 18, 1936

INVENTOR
Harold E. Wilber.
BY
Harness, Dickey, Pierce & Hann
ATTORNEYS.

Patented Jan. 17, 1939

2,144,445

UNITED STATES PATENT OFFICE 2,144,445

MOTOR CONTROL SYSTEM

Harold E. Wilber, Detroit, Mich., assignor to Continental Motors Corporation, Detroit, Mich., a corporation of Virginia Original application September 19, 1936, Serial No. 101,554. Divided and this application March 4, 1937, Serial No. 128,915

4 Claims. (Cl. 290—50)

The present invention relates generally to systems for generating and distributing electric power, and in particular provides an improved battery charging and distribution system. The present application is a division of applicant's copending application Serial No. 101,554, filed September 19, 1936.

Objects of the present invention are to provide an improved battery charging and distribution system of the type in which a generator associated with the system is driven by an internal combustion engine, and in which the output of the generator may be used to charge a battery and also to supply additional distribution circuits; to provide such a system in which for starting purposes, the battery may be rendered effective to drive the generator as a motor to crank an internal combustion engine; to provide such a system in which the generator, the internal combustion engine, and the various control apparatus associated therewith may be embodied in a relatively self-contained unit, which may be economically manufactured, assembled, and maintained.

Other objects of the present invention are to provide a system of the above generally stated character, embodying improved means for automatically stopping the driving engine in the event the battery to be charged thereby is fully charged and no power is being used in the distribution circuit; to provide such a system in which the stopping means is ineffective so long as current is being used in the distribution circuit; to provide such a system in which the stopping means embodies a relay mechanism responsive to the generator voltage, the actual voltage drop across such mechanism being further controlled in accordance with current conditions in the battery; and to provide such a system in which the stopping relay mechanisms act to interrupt the engine ignition circuit.

Figure 2:
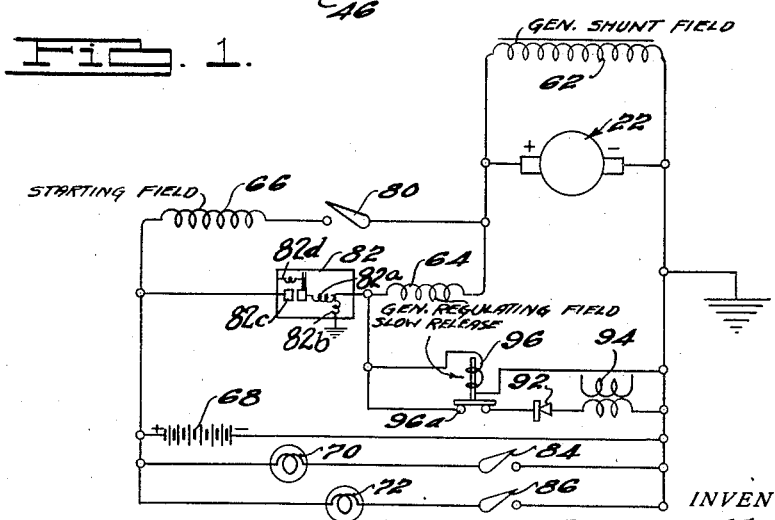

With the above and other objects, as well as more specific objects, in view, preferred but illustrative embodiments of the present invention are shown in the accompanying drawing, throughout which corresponding reference characters are used to designate corresponding parts, and in which;

Figue 1 is a view in elevation, partly in section, of a combined engine and generator unit; and Figure 2 is a schematic control diagram showing the improved automatic shut-down mechanism of the present invention.

Referring first to Fig. 1, a preferred engine and generator unit comprises generally the internal combustion engine, designated as a whole as 20, and the direct current generator, designated as a whole as 22, although it is to be understood that the improvements of the present invention may be associated with generating systems of other types, the engine 20 may be of generally conventional construction, and as illustrated is of the single cylinder type. The piston 24 is vertically reciprocable, and the connecting rod 26 associated therewith is conventionally connected to the offset 28 associated with the crank shaft 30. The crank case housing 32 is formed to provide one bearing 34 for the crank shaft 30, and a second bearing 36 therefor is provided by the end bell 38 associated with the generator 22. The bearing 36 is illustrated as comprising ball bearing elements 40 and the bearing 34 may, if desired, be correspondingly arranged. A suitable packing gland, such as 42, is provided to prevent the escape of lubricant from the crank case along the shaft 30.

A conventional flywheel 44 is keyed to the shaft 30, externally of the crank case 32. The yoke 46 of the generator, of conventionally cylindrical construction, supports four poles 49 in radially spaced relation to the armature 47. Yoke 46 is closed at one end by the cover 48 and is closed at the other end by the previously mentioned end-bell 38. The generator brush assembly designated generally as 50, is suitably secured in circumferentially adjustable relation to web 53 secured to the one end of the yoke 46 and within the end bell 38. The supply tank 54, for the engine 20, is directly supported by the yoke 46, in a position conveniently adjacent the engine 20.

It is contemplated that in practice ventilating features will be used in connection with the generator 22, but these features form no part of the present invention and in order to simplify the drawing have not been illustrated. Preferably, and as illustrated, the right hand end of the crank shaft 30, as viewed in Fig. 1, is provided with a drive pulley 52, through which engine 20 may drive further apparatus (not shown) in addition to generator 22, and which pulley may be used for emergency cranking service.

Referring particularly to Figure 2, the previously mentioned generator 22 is arranged to supply charging current to the storage battery 68 and to a plurality of distribution circuits which include, in the present instance, load elements represented by electric lamps 70 and 72. The battery is illustrated as permanently connected across the generator, in series with a conventional cutout 82. The distribution circuits are arranged for individual control by conventional switches 84 and 86.

The cut-out 82 is illustrated as including the usual current coil 82a, voltage coil 82b, and contacts 82c in series with the current coil. The voltage coil is connected to ground and so is connected directly across the armature of the generator 22. The series coil 82a, on the other hand, is energized only following closure of the contacts 82c. The contacts 82c are normally maintained open by the spring 82d.

The shut-down feature of the present invention is provided by the relay 96, the coil of which is illustrated as connected across the armature of generator 22 in series with the generator regulating series field winding 22a, and the contact 96a of which is shown as connected into the ignition circuit of the generator driving engine 20. The contact 96a of relay 96 is normally closed and the relay is so designed as to open this contact only when the voltage across the winding 96 somewhat exceeds the voltage corresponding to the fully charged condition of the battery 68.

In the operation of the present system, it is preferred to use a generator which has a substantially uniform voltage characteristic, so that under all load conditions, the voltage supply by the generator to the battery and distribution circuits is of uniform value. In instances such as the present one, in which the generator 22 is driven by an internal combustion engine, it may be expected that the speed of the engine will vary between reasonable limits in response to varying loads. In such instances, accordingly, it is necessary that the generator be so constructed and arranged as to maintain its voltage substantially constant, not only in response to varying loads, but in response to varying speeds. A preferred construction of generator having these characteristics is described in detail and claimed in applicant's above identified parent application, although other generator constructions may be used in the practice of the present invention.

The system may be placed in operation by closing the manually operable starting switch 80, which action connects generator 22 to the battery 68 in series with an auxiliary or starting series field winding 66 provided on the generator 22. The battery 68, which is to be charged by the system when the latter is in operation, thus acts to supply power to generator 22, causing it to operate as a motor and crank for the engine 20. The just mentioned starting circuit for the generator 22 extends from one terminal of the battery 68 through the field winding 66, the armature of generator 22 and shunt field winding 62 to the other terminal of the battery. Windings 66 and 62 are cumulative under these conditions, and act to supply a strong field to the machine 22 causing it to develop a sufficiently high torque to crank the engine 20. Closure of the switch 80 also completes the ignition circuit for the engine 20, which circuit extends from the positive terminal of the battery through the winding 66, switch 80, generator regulating series field winding 64, normally closed contact 96a, breaker 92, and the primary 94 of the ignition coil to the negative terminal of the battery. As soon as the cranking action causes the engine 20 to drive itself, it assumes an operating speed in excess of the speed at which battery 68 is effective to operate battery 22 as a motor and thereafter the engine 20 drives machine 22 as a generator. As soon as this relation is obtained, the starting switch 80 may be opened, excluding the starting winding 66 from the circuit.

During the time that the battery 68 is driving generator 22 as a motor, the voltage coil 82b of the cut-out 82 is subjected to a voltage proportional to the terminal voltage of the motor. The voltage across coil 82b does not become sufficient to close the contacts 82c, however, until such a time as the engine 20 starts in operation and drives machine 22 as a generator. As soon as this occurs, the output of generator 22 assumes a value sufficient to cause coil 82b to close the contacts 82d, thus connecting battery 68 across the generator 22 through the cut-out 82. It will be appreciated that the winding relation between the coils 82a and 82b is such that these coils are cumulative so long as the generator supplies current to the battery, and so cooperate to hold the contacts 82c closed. If for any reason the voltage of the generator should fall below that of the battery, so as to create a tendency for the battery to supply current to the generator, the coils 82a and 82b become subtractive, and cause the contacts 82c to promptly open.

Closure of the cut-out 82, in addition to rendering the generator 22 effective to supply charging current to the battery 68, also renders it effective to supply current to any of the distribution circuits which may be closed by operation of the associated manual switches 84 and 86. At the same time, generator 22 also impresses a predetermined voltage across the winding 96 tending to cause the contacts thereof to open.

It will be noted the coil 96 is included in one of a plurality of parallel branches of a circuit which includes as a series element the regulating series field 64. The voltage drops across the three branch circuits, including respectively the battery 68 and lamps 70 and 72, are of course always equal, and these voltage drops, plus the voltage drop across the series coil 82a of the cut-out 82, are always equal to the voltage drop across the relay coil 96. The balance of the external generated voltage of generator 22 is consumed as a voltage drop across the series regulating winding 64. The drop across each branch circuit and the drop across winding 64 thus depends upon the effective resistance of each branch circuit and the number of such branch circuits which are closed.

Where, for example both distribution circuits are closed, and battery 68 is in a relatively discharged state, the drop across relay 96 is of a relatively low value. If one or both of the distributions are opened, the resultant increase in total resistance of the load circuit is reflected as an increase in the voltage across the relay 96. The maximum voltage drop across relay 96 is produced when the battery reaches a fully charged condition and both distribution circuits are open. At this maximum voltage relay 96 operates to open the contacts 96a and interrupt the driving engine ignition circuit, thereby stopping the system. Relay 96 may be conventionally constructed to retain its contacts when opened in open position until the generator voltage has fallen to a value corresponding to such a low speed of the engine that a cranking operation is necessary to restart the engine. Preferably, relay 96 is constructed to have a slow release, so that it retains its contacts open until the engine has come entirely to rest.

This maximum or operating voltage of relay 96 is not obtained, however, if either or both of the distribution circuits are closed, even though the battery 68b is in the fully charged condition, since closure of a distribution circuit materially reduces the total resistance of the generator load circuit. This reduction in resistance is reflected as an increase in the generator output current which increases the voltage drop across the series field winding 64 and decreases the voltage drop across the winding 96.

Following each starting operation of the system, accordingly, the engine remains in operation as long as any distribution circuit is closed and as long as the voltage of the battery 68 is below the voltage corresponding to a fully charged condition thereof. The stopping of the system on the other hand occurs automatically when the battery reaches a fully charged condition provided no distribution circuits are closed. If at the time the battery reaches the fully charged condition one or more distribution circuits are closed, the engine remains in operation until all distribution circuits are opened, at which time the engine is stopped.

Although a specific embodiment of the invention has been shown and described, it will be appreciated that various modifications in the form, number and arrangement of parts may be made within the spirit and scope thereof.

What is claimed is:

1. In a system of the character described, a generator, a battery to be charged by said generator, an openable and closeable distribution circuit to be supplied by said generator; means having predetermined resistance; means connecting said battery, distribution circuit and resistance means to said generator with said battery and said distribution circuit in parallel branches of a circuit which includes said resistance means in series; relay mechanism connected in parallel with said battery circuit branch and in series with said resistance means; said relay mechanism and said resistance means being so proportioned relative to said battery and distribution circuits that said relay is prevented from receiving sufficient voltage to operate said relay except when said distribution circuit is open and said battery is in a fully charged condition; and means actuated by said relay mechanism for controlling said generator.

2. An electrical system of the character described comprising a generator having a regulating series field winding; a battery to be charged by said generator; a distribution circuit selectively openable and closeable and adapted to be supplied by said generator; circuit connections for connecting said battery and said distribution circuit in parallel with each other and to said generator in series with said regulating series field winding; relay mechanism connected in parallel to said battery circuit branch and in series with said regulating series field winding; said relay mechanism and said field being so proportioned relative to said battery and distribution circuits that said relay is prevented from receiving sufficient voltage to operate said relay except when said distribution circuit is open and said battery is in a fully charged condition; and means actuated by said relay mechanism for controlling said generator.

3. In a system of the character described, utilizing a generator; a drive member for said generator; a battery to be charged by said generator; and an openable and closeable distribution circuit to be supplied by said generator; the combination in said system of means having predetermined resistance; means connecting said battery, distribution circuit, and resistance means to said generator with said battery and said distribution circuit in parallel branches of a circuit which includes said resistance means in series; relay mechanism connected in parallel with said battery circuit branch and in series with said resistance means; said relay mechanism and said resistance means being so proportioned relative to said battery and distribution circuits that said relay is prevented from receiving sufficient voltage to operate said relay except when said distribution circuit is open and said battery is in a fully charged condition; and means rendering said relay mechanism effective to control said drive member.

4. An electrical system of the character described comprising a generator having a regulating series field winding; a drive member for said generator; a battery to be charged by said generator; a distribution circuit selectively openable and closeable and adapted to be supplied by said generator; circuit connections for connecting said battery and said distribution circuits in parallel with each other and to said generator in series with said regulating series field winding; relay mechanism connected in parallel to said battery circuit branch and in series with said regulating series field winding; said relay mechanism and said field being so proportioned relative to said battery and distribution circuits that said relay is prevented from receiving sufficient voltage to operate said relay except when said distribution circuit is open and said battery is in a fully charged condition; and means rendering said relay mechanism effective to control said drive member.

HAROLD E. WILBER.